Oct. 13, 1931.  V. BOSCHETTI  1,827,639

HEATER

Filed May 10, 1929

WITNESSES

INVENTOR
Vincenzo Boschetti
BY
ATTORNEYS

Patented Oct. 13, 1931

1,827,639

UNITED STATES PATENT OFFICE

VINCENZO BOSCHETTI, OF UNION CITY, NEW JERSEY

HEATER

Application filed May 10, 1929. Serial No. 362,051.

The present invention relates to heaters.

It is among the objects of the invention to provide a novel and improved water heater electrically energized.

It is a further object of the invention to provide a water heater including a plurality of spaced oppositely polarized electrodes.

Another object of the present invention is to provide a water heater including a plurality of electrodes adapted to be submerged in the water, whereby the water is heated by the discharge of electricity between said electrodes.

Other objects of the present invention include the combination and interrelation of parts whereby the whole forms a simple and efficient structure well designed to meet the demands of economic manufacture.

Figure 1:
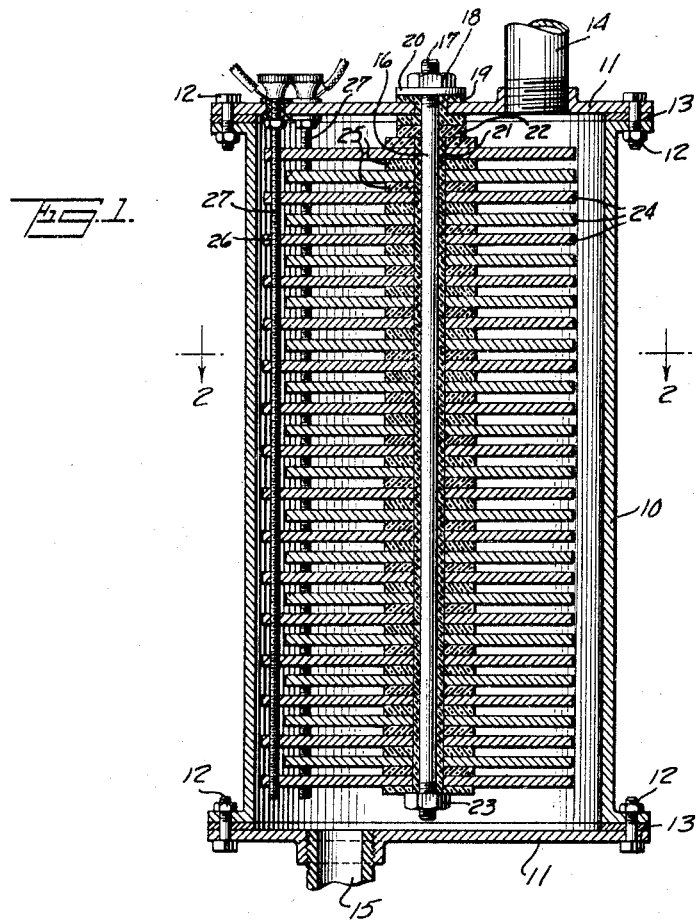
Figure 2:
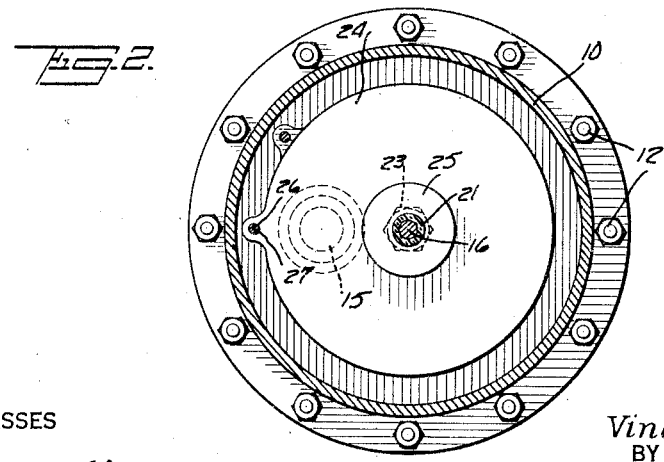

Numerous other objects and features of the present invention will be apparent from a consideration of the folowing specification taken in conjunction with the accompanying drawings, in which Figure 1 is a sectional view of one form of the present invention, and Fig. 2 is a cross section taken on the line 2—2 of Fig. 1.

Referring more particularly to the drawings, the invention includes a casing shown as cylindrical in form and illustrated as at 10, the upper and lower ends of which are closed by plates 11 which are preferably removably bolted to the casing 10 by the members 12, suitable packing 13 being provided between the casing and the plates 11 to insure proper sealing. The plates 11 are provided with inlet and outlet pipes as indicated at 14 and 15, respectively. The inlet and outlet pipes are preferably threadedly secured through apertures in the pipes 11, or may be otherwise associated therewith. Secured to one of the plates 11, here illustrated as the upper plate, there is provided a longitudinally extending shaft 16, which is secured to the plate by extending therethrough, its projecting extremity being threaded as at 17 to receive a securing nut 18. The aperture of the plate 11 is preferably larger than the shaft 16 to provide room for an insulating and sealing washer 19, which surrounds the shaft at the plate and which is abutted by a washer 20 under the nut 18, thus rigidly supporting the shaft 16 within the casing 10.

Mounted upon the shaft 16, is a tubular insulating member 21, the upper end of which abuts an insulating washer 22 carried below the nut 18. The member 21 is secured on the shaft by a nut 23 at the lower end thereof. Mounted upon the member 21 there is provided a plurality of metallic electrodes 24 spaced from each other by insulating washers 25, the arrangement being such that each of the electrodes 24 is spaced and insulated from the supporting shaft 16.

The electrodes 24 are shown as substantially disk-like, each being provided with an extending internally threaded apertured ear 26. Through the plate 11 a pair of externally threaded conducting rods 27 are provided being insulated from the plate 11 by bushings 28, through which they extend. Each of the rods 27 is continuously threaded for threaded engagement with every other one of the electrodes 24; thus consecutive electrodes may be oppositely polarized through providing a suitable potential across the external terminals of the conductors 27. By referring to Fig. 2, it will be seen that the electrodes are angularly related so that the ears 26 of every other electrode are in alinement, thus providing for the extension through all of them and the threaded engagement of each, of one of the conductors 27.

It has just been stated that the conductor rods 27 are continuously threaded. This arrangement has a manifest advantage. It is of utmost importance to initially establish and subsequently maintain a proper spacing of the electrodes 24. The threads on the rods 27 are admirably adapted to this purpose.

These rods are secured off-center to one of the header plates 11 so as to occupy a position near one side of the casing 10. It is now that the ears 26 come into play. These extend off from the edges of the electrodes and threadedly receive the rods 27.

In assembling the electrodes 24 on the rods 27 the ears 26 will be screwed on until the various electrodes assume exactly the proper positions. When the spacing is once established it remains permanent, there being no possibility of the electrodes slipping down on the threaded rods.

The shaft 16 with its arrangement of insulation stabilizes the center of the electrode assemblage. The chief purpose of the shaft and its insulating means is to prevent any possibility of sagging of the electrodes.

In the operation of the device, the fluid to be heated, such as water, is admitted to the device preferably through the inlet 14, thus surrounding and submerging the structure therein. The fluid is emitted through the discharge pipe 15. With a resistance conductor, such as water, surrounding the plates 24 and with a potential applied across the conductors 27, it will be seen that every other plate has applied thereto a potential opposite to its next adjacent plate. The passage of current between the plates is accomplished by means of the resistance conducting fluid which in its conduction heats in the usual manner. Thus the fluid, such as water, is heated while in the chamber or casing 10 and the heated water is discharged through the outlet pipe 15.

It will be understood that suitable valves may be arranged for controlling the speed of passage through the chamber, thus the degree of heat of the fluid may be easily regulated.

From the foregoing it will be seen that the invention provides a simple and efficient structure, readily designed to accomplish the objects of the invention as hereinbefore set forth.

It is further to be understood that numerous changes and modifications in the structural details herein illustrated and the full use of equivalents may be resorted to without departing from the spirit or scope of the invention as outlined in the appended claims.

What is claimed is:

1. In a fluid heater having an enclosure with an inlet and an outlet; a pair of continuously threaded current conducting rods mounted within and to one side of the casing, a plurality of electrodes occupying the casing, said electrodes having ears alternately threaded on the respective rods and being spaced from each other by the threads, a shaft affixed to the casing and passing through the electrodes to stabilize the center of the assemblage, and means to insulate the successive electrodes from each other and from said shaft.

2. In a fluid heater, a continuously threaded rod, a casing having a header plate to which the rod is secured for support, and a plurality of electrodes, each having an ear threadedly receiving the rod and being spaced by the threads thereon.

3. In a fluid heater, a casing having a header plate, a continuously threaded rod secured off-center to the header plate to occupy a position near one side of the casing, and a plurality of electrodes extending across the center of the casing, being secured to the rod by screwing and being spaced by the threads on the rod.

VINCENZO BOSCHETTI.